(12) United States Patent  
Siguenza et al.

(10) Patent No.: US 8,392,862 B1  
(45) Date of Patent: Mar. 5, 2013

(54) STRUCTURES AND METHODS FOR OPTIMIZING POWER CONSUMPTION IN AN INTEGRATED CHIP DESIGN

(75) Inventors: Oscar Siguenza, San Jose, CA (US); Duane Breid, Lakeville, MN (US); Gene Sluss, Pleasanton, CA (US); Deepak Sherlekar, Cupertino, CA (US); Mike Colwell, Morgan Hill, CA (US)

(73) Assignee: Synopsys, Inc., Mountain View, CA (US)

( * ) Notice: Subject to any disclaimer, the term of this patent is extended or adjusted under 35 U.S.C. 154(b) by 500 days.

(21) Appl. No.: 11/657,228

(22) Filed: Jan. 23, 2007

Related U.S. Application Data

(60) Provisional application No. 60/761,474, filed on Jan. 23, 2006.

(51) Int. Cl.  
*G06F 17/50* (2006.01)

(52) U.S. Cl. ....................................... 716/120

(58) Field of Classification Search ................. 716/1–21  
See application file for complete search history.

(56) References Cited

U.S. PATENT DOCUMENTS

| | | | |
|---|---|---|---|
| 5,321,337 A | 6/1994 | Hsu | |
| 5,449,988 A | 9/1995 | Gurstein et al. | |
| 5,694,007 A | 12/1997 | Chen | |
| 5,719,473 A | 2/1998 | Huber et al. | |
| 5,790,395 A | 8/1998 | Hagen | |
| 5,834,924 A | 11/1998 | Konopka et al. | |
| 5,872,430 A | 2/1999 | Konopka | |
| 5,886,431 A | 3/1999 | Rutigliano | |
| 5,920,186 A | 7/1999 | Ninh et al. | |
| 5,973,419 A | 10/1999 | Kruppa et al. | |
| 5,991,175 A | 11/1999 | Liu | |
| 6,297,979 B1 | 10/2001 | Tse | |
| 6,559,623 B1 | 5/2003 | Pardoen | |
| 6,703,889 B2 | 3/2004 | Dodson, III | |
| 6,967,853 B2 | 11/2005 | DeFazio et al. | |
| 6,968,465 B2 | 11/2005 | Freevol et al. | |
| 7,218,537 B2 | 5/2007 | Sherwood et al. | |
| 7,355,368 B2 | 4/2008 | Salato et al. | |
| 7,535,691 B2 | 5/2009 | Mayell | |
| 7,760,479 B2 | 7/2010 | Garrett | |
| 2002/0138817 A1* | 9/2002 | Lee et al. | 716/12 |
| 2003/0140322 A1* | 7/2003 | Law | 716/4 |
| 2005/0068015 A1* | 3/2005 | Hazucha et al. | 323/272 |
| 2005/0091629 A1* | 4/2005 | Eisenstadt et al. | 716/13 |
| 2005/0276132 A1* | 12/2005 | Severson et al. | 365/202 |

OTHER PUBLICATIONS

Kim, et al., "Understanding and Minimizing Ground Bounce During Mode Transition of Power Gating Structures", Proceedings of the 2003 International Symposium on Low Power Electronics and Design, Aug. 2003, pp. 22-25.*

* cited by examiner

*Primary Examiner* — Vuthe Siek  
*Assistant Examiner* — Aric Lin  
(74) *Attorney, Agent, or Firm* — Fenwick & West LLP

(57) ABSTRACT

Various methods and apparatuses are described for a power distribution structure. In an embodiment, an integrated circuit contains power gating cells that each contain Metal Oxide Semiconductor (MOS) device switches located relative in the power distribution structure to power up and down a block of logic containing a plurality of individual cells using these MOS device switches. The MOS device switches can be tuned to requirements of a target block of logic in order to meet its optimal voltage drop requirements during its active operational state while minimizing leakage current in its off state.

16 Claims, 15 Drawing Sheets

|  | Total 10um Power Gates | Performance Degradation | Leakage Savings |
|---|---|---|---|
| 2% Vdd Drop Target (Idd=200mA) | 8134 | 1.05% | 73.80% |
| 5% Vdd Drop Target (Idd=200mA) | 2918 | 2.86% | 91.20% |

266

| TSMC 90nm G-LowK | Power Gate Cell Count | Area (um^2) | Area (% block size) | Leakage (mW) |
|---|---|---|---|---|
| Nominal Vt device | 764 | 64894.67 | 1.30% | 5.936 |
| High Vt Device | 882 | 75911.27 | 1.50% | 1.800 |
| 2.5v I/O Device | 5550 | 477673 | 9.40% | 0.052 |

268

STRUCTURES AND METHODS FOR OPTIMIZING POWER CONSUMPTION IN AN INTEGRATED CHIP DESIGN

RELATED APPLICATIONS

This application claims the benefit of U.S. Provisional Application No. 60/761,474 filed on Jan. 23, 2006.

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

TECHNICAL FIELD

Some embodiments of this invention relate to the field of power routing and, in particular, to a low power circuit design and selective power down of individual blocks of circuit inside an Application Specific Integrated Circuit, System on a Chip, etc.

BACKGROUND

Controlling current leakage and power consumption through voltage drops (VD) across components can allow a designer to extended battery life for mobile computing devices as well as decrease heat generation in all devices. When using a Metal Oxide Semiconductor (MOS) device for gating power to a circuit, the device must be large enough that the voltage drop across the device in ON state does not impact the circuit performance. However, sometimes this comes at the expense of excess current leakage. Therefore, a device selected to be optimized to meet a target voltage drop requirement during active operation of one circuit is not optimal for all circuits. In designs of 65 nanometer spacing designs and smaller, current leakage can be a significant portion of an active power budget.

SUMMARY

Various methods and apparatuses for a power distribution structure. In an embodiment, a library for the power distribution ring structure has a selectable composition of amount of and types of cells to optimize each design's optimal needs as well as a selectable placement of each of those cells within the power distribution ring structure. A first instance of the power distribution ring contains a first set of two or more types of cells including a power gating cell and an enable cell. A second instance of the power distribution ring contains a second set cells that differs in composition from the first instance in amount of each type of cells and placement of cells included in the composition of the second set of cells. Each power gating cell also includes a selection of two or more cell varieties that fulfill a function of the power gating cell but have different characteristics for ON state resistance for voltage drop across that power gating cell and OFF state leakage current characteristics for that power gating cell. A computer readable medium may store the library. The library contains instructions making the library callable from an executable program. In conjunction with the executable program the library generates a representation of at least the power distribution ring in response to execution of the executable program utilizing the library with callable instructions.

Other aspects of the invention will be apparent from the accompanying figures and from the detailed description, which follows.

BRIEF DESCRIPTION OF THE DRAWINGS

One or more embodiments of the invention are illustrated by way of example and not limitation in the figures of the accompanying drawings, in which like references indicate similar elements and in which.

Figure 1A:
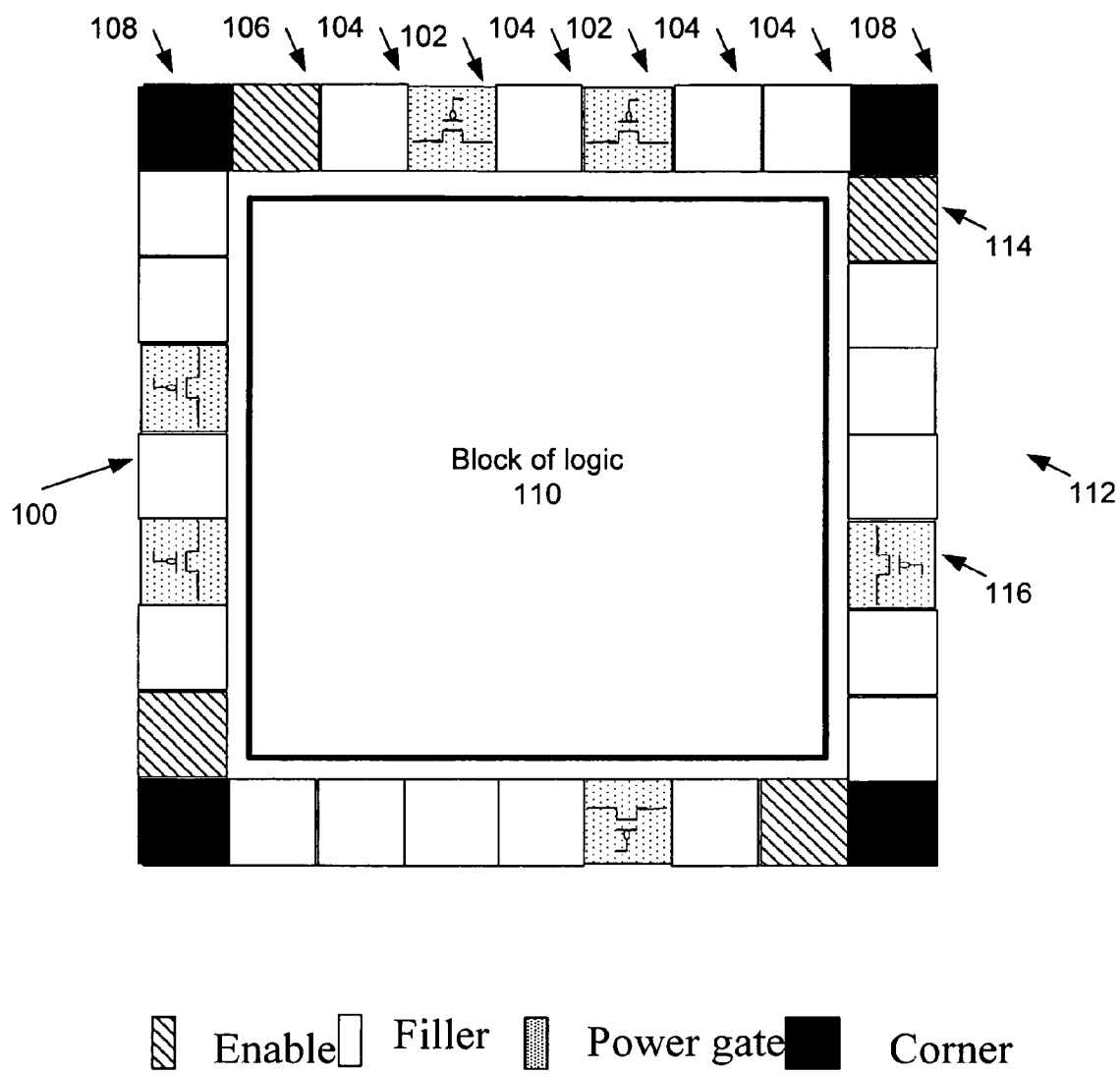
FIGS. 1a and 1b illustrate block diagrams of embodiments of the power gating structure in a ring shape around a block of logic to be powered up or down with power gate cells in the power distribution structure.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, types of power gating designs, etc., in order to provide a thorough understanding of the present design. It will be apparent, however, to one skilled in the art that the present design may be practiced without these specific details. In other instances, well known components or methods have not been described in detail but rather in a block diagram in order to avoid unnecessarily obscuring the present design. Thus, the specific details set forth are merely exemplary. The specific details may be varied from and still be contemplated to be within the spirit and scope of the present invention. The following drawings and text describe various implementation of a logic platform design such as a low power circuit invention. The low power circuit design may implement selective powering down of individual blocks of circuit inside a chip, such as an Application Specific Integrated Circuit (ASIC), System on a Chip (SoC), or similar embedded device.

In general, various methods and apparatuses are described for using power gates to provide power to a block of logic or even individual components within that block of logic. In an embodiment, the chip has power gating cells each containing Metal Oxide Semiconductor (MOS) device switches located relative in a power distribution structure that allow designers to dynamically power up and power down a block of logic containing a hundreds or thousands of individual cells using these MOS device switches. The selected MOS device switch for each design can be tuned to requirements of a target block of logic to meet its optimal voltage drop requirements during its active state while minimizing leakage current in its off state.

Figure 1B:
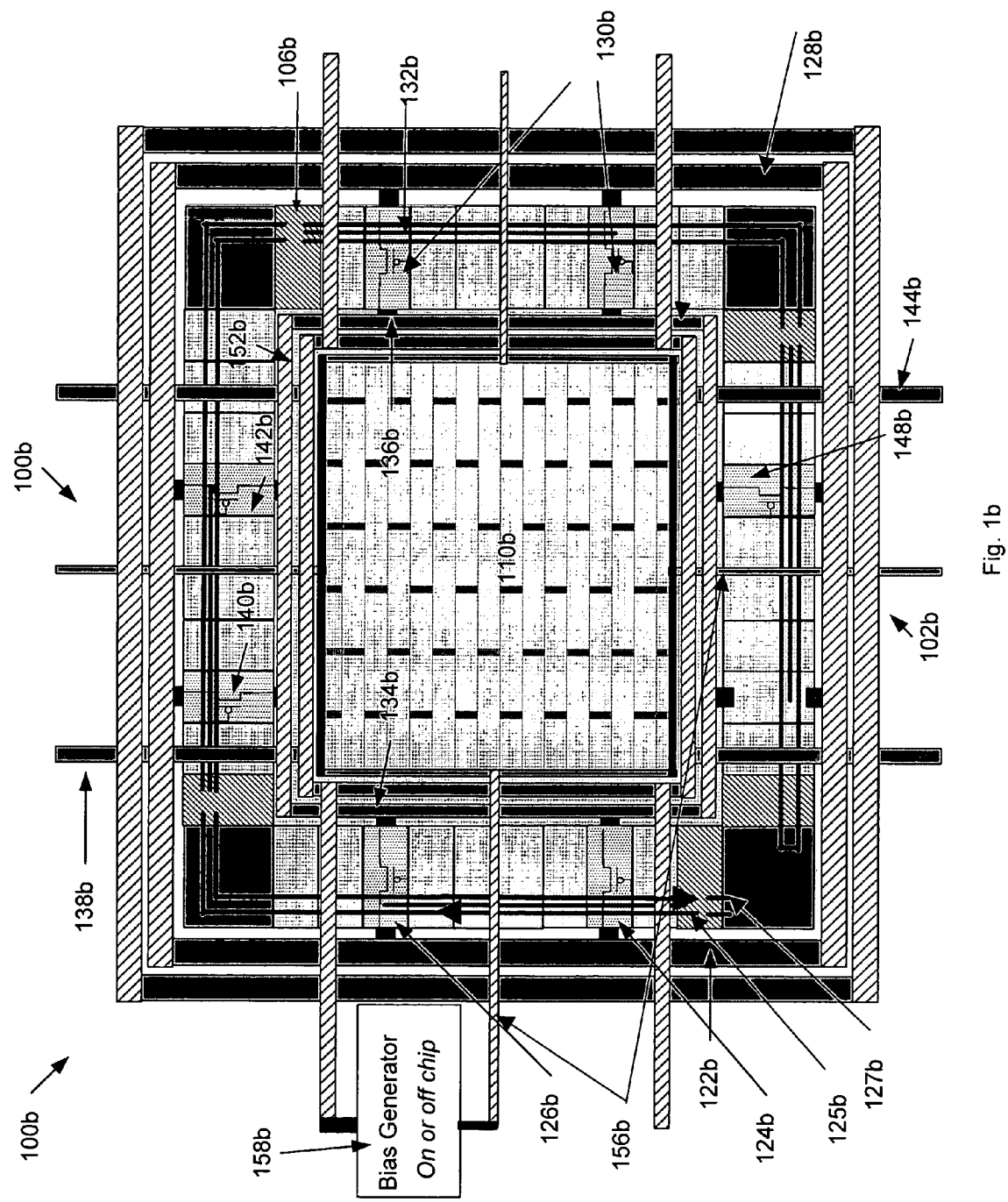

FIGS. 1a and 1b illustrate block diagrams of embodiments of the power gating structure in a ring shape around a block of logic to be powered up or down with power gate cells in the power distribution structure.

Referring to FIG. 1a, the power distribution structure 100 may have a ring shape and compilation of different types of cells including one or more power gating cells 102, one or more filler cells 104, one or more enable cells 106, and one or more corner cells 108, to supply power on or off to a logic block 110 in the chip by gating an operational state of the power gating cells 102 on and off. Each side of the ring structure, such as a first side 112, can have one or more power gating cells 102, one or more filler cells 104, one or more enable cells 106, and one or more corner cells 108, to control the rate of an in-rush current and voltage ramp up rates at the connection nodes around the ring structure to the logic block 110 in the chip. The power gating cells 102 each contains Metal Oxide Semiconductor, (MOS) device switches to power up or down the associated block of logic 110. The selected MOS device switches for each design can be tuned to the requirements of a target block of logic 110 to meet its optimal voltage drop requirements during its active state while minimizing leakage current in its off state. The enable cells 106, such as a first enable cell 114, provide a signal for the gate of the MOS switching device to control an operational state of one or more power gating cells coupled to the output of the respective enable cell. The enable cells 106 also buffer an acknowledge signal and propagates the acknowledge signal around the ring structure. The corner cells 108 provide connection of power buses between the sides of the ring structure and top/bottom of the ring shaped structure. The corner cells, such as a first corner cell 120, can also be used as a source of the acknowledge signal, or to break the acknowledge loop into multiple segments. As discussed, the power gate cells 102 may contain MOS devices with their source/drain terminal connected to the respective VDD/VBP (substrate biasing)/VSS (ground potential) power rail. The MOS devices may be a Metal Oxide Semiconductor Field Effect Transistor formed to be either a NMOS (n-channel) transistor or a PMOS (p-channel) transistor. The filler cells 104 may contain PMOS or NMOS devices with source and drain terminals that are unwired and unconnected to any power rail.

Referring to FIG. 1b, the power distribution structure 100b may have a ring shape with different amounts and types of cells. Note, the ring shape is an example and other shapes are possible. A first global VSS power rail 122b in a metal layer, such as metal layer 2, may connect down to the first power gate 124b and second power gate 126b with a via or interconnect to supply a switchable on/off VSS power to the logic block 110b. A second global VSS power rail 128b in a metal layer may connect down to the third power gate 130b and a fourth power gate 132b with a via or interconnect to supply a switchable on/off VSS power to the other side of the logic block 110b. The first through the fourth power gates 124b, 126b, 130b, 132b, then connect using vias or interconnects back up to VSS power rails 134b, 136b, local to that block of logic 110b.

Likewise, a first global VDD power rail 138b in a metal layer may connect down to the fifth power gate 140b and a sixth power gate 142b with a via or interconnect to supply a switchable on/off VDD to the logic block 110. A second global VDD power rail 144b in a metal layer may connect down to the seventh power gate 148b with a via or interconnect to supply a switchable on/off VDD power to the other side of the logic block 110b. The VDD power or VSS power from the global rails may be switchable turned off through the respective power gates when the logic block is in a sleep or reduced power state. The fifth through seventh power gates 140b, 142b, 148b then connect using vias or interconnects back up to VDD power rails 150b, 152b local to that block of logic 110b. Another power gate could be used to supply a switchable substrate biasing potential (VBP) to individual cells within that block to aid in data retention when either VDD or VSS is turned off in a sleep mode. The third power rail 156b provides a third voltage potential VBP that is switchably turned off during the sleep mode to the substrates of selected individual cells.

The power distribution structure 100b may also have a bias chip generator 158b to supply different operating voltages for individual cells in the logic block 110b. The block of logic 110b composed of different individual cells can have multiple levels of operating voltage, such as 3.3 Volts (V), 1.25V, 0.8V, etc. The individual cells in the block of logic 110b connect to local power traces that provide a multiple levels of voltage potential from the power distribution structure 100b.

The power distribution structure 100b provides an architecture for implementing power gating circuits using Metal Oxide Semiconductor (MOS) device switches, and an accompanying methodology that allows designers to dynamically power up and down a block of logic inside a chip using these MOS device switches. The power gating cells 102b containing their switches can be tuned to the requirements of the target circuit/block of logic to meet its voltage drop targets while minimizing leakage, in-rush currents, and localized transients. As discussed, MOSFETs are either NMOS (n-channel) or PMOS (p-channel) transistors, which are fabricated as individually packaged discrete components for high power applications as well as by the hundreds of millions inside a single chip (IC). Each variety of MOSFET has different operational characteristics such as a conduction voltage threshold, saturation voltage curve, area occupied, etc. A smaller voltage drop to change state from an OFF state to an ON state increases the speed and performance of the device.

When using a MOS device to gate power to a circuit, the MOS device should be large enough that the voltage drop across the device in ON state does not impact the circuit performance, typically measured in clock cycles or nanosecond response time. However, in the past this voltage drop may come at the expense of excess consumption of power due to current leakage in the power gate when the associated logic block 110b is supposed to be powered off. Therefore, a power switching device optimized to meet a target voltage drop requirement during active operation of one circuit is not optimal for all circuits. However, the power distribution structure 100b allows an entire device to be selectively optimized with one or more power gate cells and their corresponding MOS switches to meet a target voltage drop requirement during active operation and minimize current leakage when a particular logic block in the device is powered off.

The power gate cells 102b contain the MOS device that turns on or shuts down power to the block. Multiple varieties of power gate cells are made available from a common library for the power distribution structure 100b, where each variety of power gate cell contains a different MOS device. A large variety of MOS devices are possible, such as N or P channel devices, different voltage threshold for conduction devices, devices with different channel lengths, devices with different gate oxide thickness, etc. Any device that provides a unique saturation current vs. leakage current profile may be used. The amount of power gating cells providing power to a particular node can be varied to meet the target block's needs.

In the power distribution structure 100b, a 'filler' cell may be used in place of a power gate cell. This feature provides another option to tune the cumulative ON resistance of the power gating cells 102b while minimizing current leakage. When there is risk of unpredictable block level currents, the original selection of cells in the power distribution structure 100b can provide an adequate number of filler cells 104b, which can be easily swapped with power gate cells after first silicon prototyping when the block level current can be accurately measured.

As discussed, the enable cells 106b provide support for turning on and off the power gate cells. The enable cell is decoupled from the power gating cell making two distinct cell types so that the enable cell may drive the gate of one or more power gating cells. An enable rail 125b may connect to the enable cell output and the gate of each power gate cell. The enable rail 125b runs the length of each side of the ring structure 100b. The enable cell creates a signal on a gating rail for the gate of the MOS switching device in each associated power gating cell. In an embodiment, an enable rail 125b connects to the enable cell output ENX and connects to the next enable cell input EN to continue the signal around the ring. The ENXB output of the enable cell connects to a similar rail, which spans one or more power gate inputs. The signals originating from the ENX pins carry the signal across the ring in one direction, which then turns and returns by defining a counter connection at the end of the chain from ENX to A pins, pins illustrated in 884 (See FIG. 6). The signal then returns through an AX to A signal connection through the same set of enable cells. The enable cell 106b originating the enable signal through its EN pin will then provide the acknowledge signal through its AX output pin.

As discussed, the enable cell also buffers an acknowledge signal on the acknowledge rail 127b and propagate the acknowledge signal around the ring. In addition the basic layout used to implement the enable cells can be used as infrastructure cells for voltage islands such as isolation cells and level shifters, for testability such as JTAG registers and/or control logic, for clock distribution such as clock gating structures and other signals requiring conditioning under different ON/OFF power states and/or to provide bypass capacitance. The corner cell can also be used as a source of the acknowledge signal, or to break the acknowledge loop into multiple segments. Similar techniques can also be used within the sides on the ring to break up the acknowledge loop into smaller loops.

The ring structure used for power gating can also support a triple well technology by assembling the protection guard ring with the cells used in the ring. In this case, the cells forming the power distribution structure 100b also include the layout features needed to assemble the ring by abutment. The power gating cells 102 with selectable MOS devices allow leakage control at the macro level and system-level power features to control leakage in the chip.

The flexible shape and composition of cells within the power distribution structure from a single library provides flexible power gating solution that can be customized to the application by providing a means to select from a set of MOS devices of different sizes that achieve different trade-offs between ON state resistance for voltage drop across that component and OFF state leakage characteristics for that component. This enables the designer to achieve the optimal performance vs. density trade-offs for all applications.

FIGS. 2a-2f show projected simulation results of different power distribution structures having different compositions of cells and the resulting characteristics of each instance of the power distribution structure. FIG. 2a-2d illustrates four graphs of various voltage and current characteristics of the logic block being powered by different instances of the power distribution structure over time. The first graph 2a represents voltage and current characteristics of the logic block being powered by a first instance of the power distribution structure 260 with a first composition of amount of and types of cells. The voltage ramps up to the normal operating voltage in 1000 microseconds. The current gradually peaks at about 4.5 milliamps at the 1000 microsecond point. The second graph 2b illustrates that a small amount of transient noise at less than 10 millivolts peak voltage occurs for the initial 80 microseconds for the first instance of the power distribution structure 260. The third graph represents voltage and current characteristics of the same logic block being powered by a second instance of the power distribution structure 262 with a second composition of amount of and types of cells. The third graph 2c illustrates that the voltage ramps up to the normal operating voltage in about 4 microseconds. The current swings greatly vary and peak at about 24 milliamps but arrive at the normal operating current at about 4.5 milliamps at the 4 microsecond point. The fourth graph 2d illustrates that a large amount of transient noise peaking around 300 millivolts occurs for the initial 1.5 microseconds for the second instance of the power distribution structure 262. The library for the power distribution structure allows a selectable composition of amount of and types of cells to optimize each design's optimal needs as well as a selectable placement of each of those cells within the power distribution ring structure. Thus, a first instance of the power distribution ring from the same library could contain a first set of two or more types of cells including a power gating cell and a power gate driver cell. The composition also includes a first amount of each different type of cells. Moreover another instance of the power distribution ring from the library may contain a second set cells that differs in composition from the first instance in types of cells included, amount of each type of cells, and placement of the cells included in the composition of the second set of cells. Also, each power gating cell includes a selection of two or more cell varieties that fulfill the function of the power gating cell but have different characteristics for ON state resistance for voltage drop across that component and OFF state leakage current characteristics for that component. The variety of power gating cells may have its own different MOS type device. This enables a designer to achieve an optimal trade-off between leakage, in-rush currents, and localized transients on the one hand, and density and IR drop on the other, for instances of power structure designs in all applications.

Figures 2A, 2B, 2C, 2D:
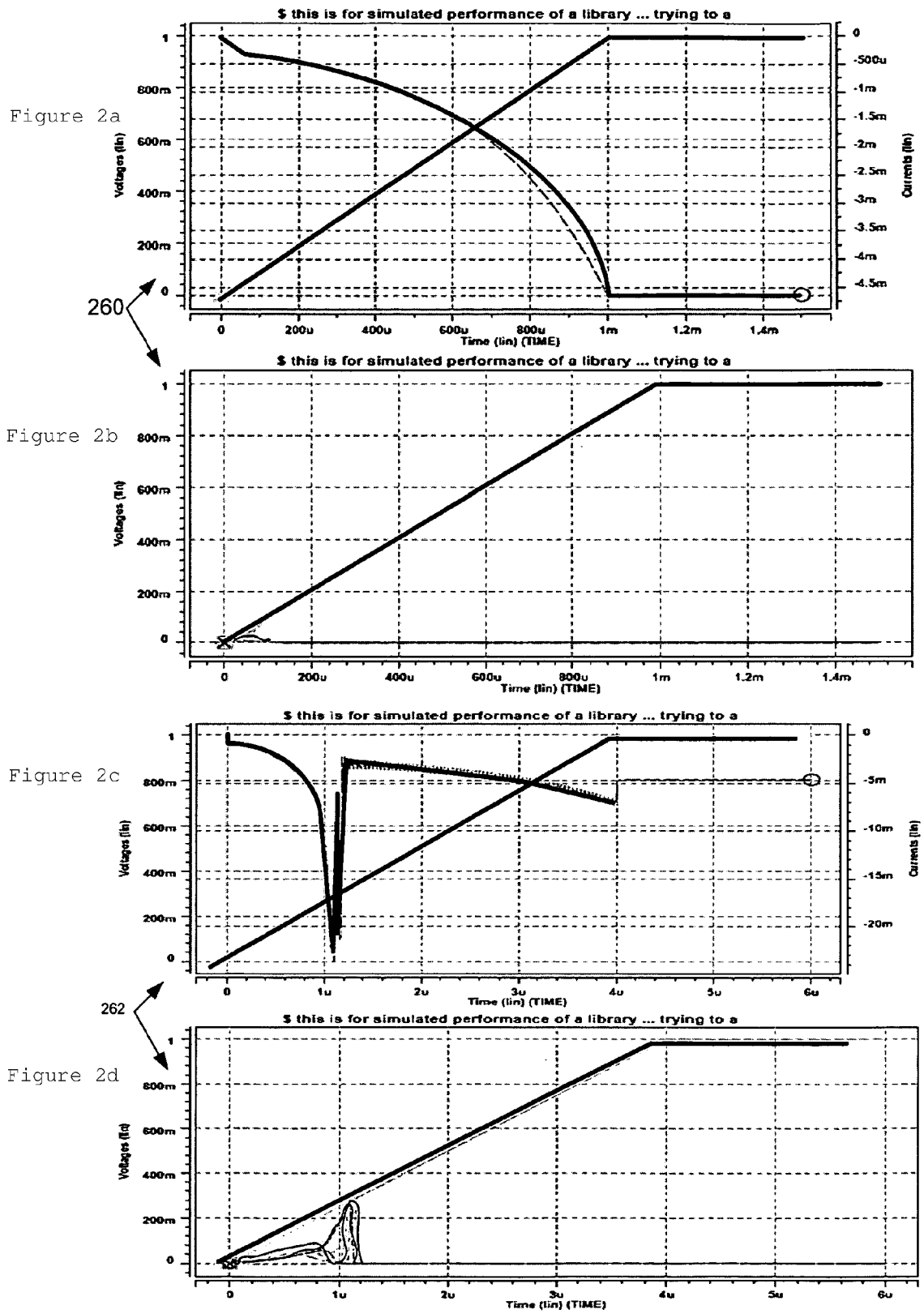
FIGS. 2a-2f show projected simulation results of different power distribution structures having different compositions of cells and the resulting characteristics of each instance of the power distribution structure.
Figure 2E:

FIG. 2e shows a table showing instances of embodiments of the power distribution structure being composed of different amounts of power gating cells, enable cells, and filler cells. The table 266 shows the target voltage drop to current leakage, performance and area trade offs a designer can balance and the library will suggest the best combination of cells to achieve the numbers the designer is satisfied with. The amount of power gate cells used may depend on a normal operation power drop specification. For a fixed power drop specification, the number of cells needed to sustain performance can vary depending on transistor type used. Even though High-Voltage threshold and I/O devices require more area, leakage savings can be much more substantial for each variety of MOS.

The ring structure of different types of cells allows for a ratio variation between an amount of enable cells, i.e. power gate driver cells, to the number of power gates in order to control a current or voltage ramp time tuning at nodes within the logic block on a per design basis. Increasing the ratio of power gate driver cells to the number of power gates decreases the current or voltage ramp time to achieve specific thresholds at nodes within the logic block.

As discussed, the choice of variety of MOS switch device can be based on voltage threshold characteristics for best performance including additional factors of—Idsat/I leakage, select Vt/Transistor Oxide type, trade-off in reduction in current leakage vs. area consumed by a total number of power gates need, etc. Note, the total transistor area needed for gating a circuit depends on a few parameters such as transient voltage drop, DC voltage drop, Electromigration limits (both peak and rms), $Vn\_switch = Idd\_block \times Rds\_switch$, etc. Allowing the composition of the power distribution structure to be selectable for each instance to optimally balance having too many cells, which allows reduced power drops, versus total leakage savings by having fewer cells.

Figure 2F:

FIG. 2f illustrates a table with a performance versus leakage current savings trade-off for an embodiment of the power distribution structure. The table 268 shows the type of MOS device to current leakage, power gate count, and area trade offs a designer can balance and the library will suggest the best combination of cells to achieve the numbers the designer is satisfied with. Allowing a larger voltage drop can decrease the number of power gates. The smaller number of power gates leads to higher current leakage savings. The performance degradation in timing can be made up by adding additional timing margin for the design. The libraries are flexible enough to be able to use them from a simple not power optimized design to a fully power optimized design while keeping basically the same cell set. The library for the power distribution structure gives enough flexibility of design and predictability so a designer can dial in their power savings number while not over-complicating the design.

Figure 6:
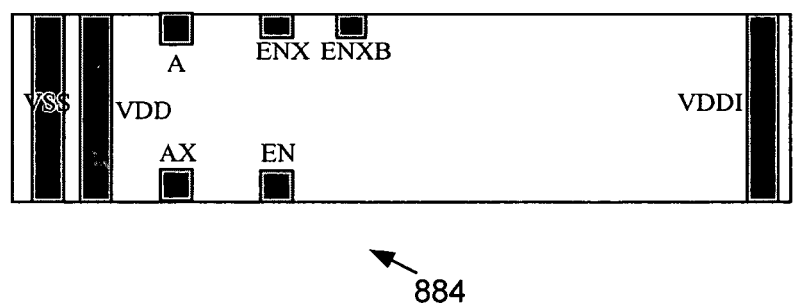
FIG. 6 also shows a block diagram of an embodiment of individual cell level power gating in the chip.
Figure 7:
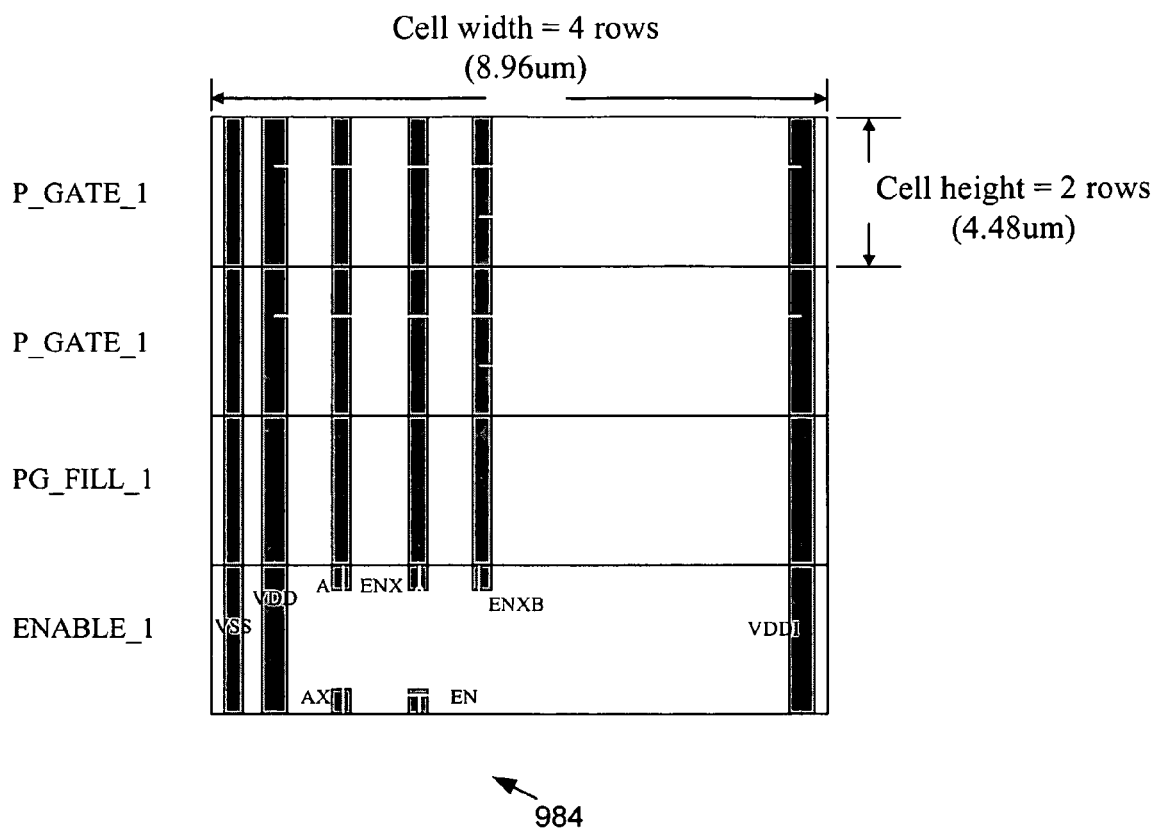
FIG. 7 shows the width and height of example enable cells, filler cells and the power gating cells.

The power gating structure may achieve the exact drive of the power gating elements forming the ring. In this case, an alternate power gating cell is provided which is wider and supports a higher drive device for delivering additional current to the block. See FIGS. 6 and 7. FIG. 7 shows the width and height of example enable cells, filler cells and the power gating cells.

The power gating design provides IC designers the capability to customize a solution to power down portions of a chip, for a period of time when that logic is not being used in the device, by providing a set of options to achieve a target performance for an optimal trade-off between leakage, area, and voltage/current transients.

Figure 3:
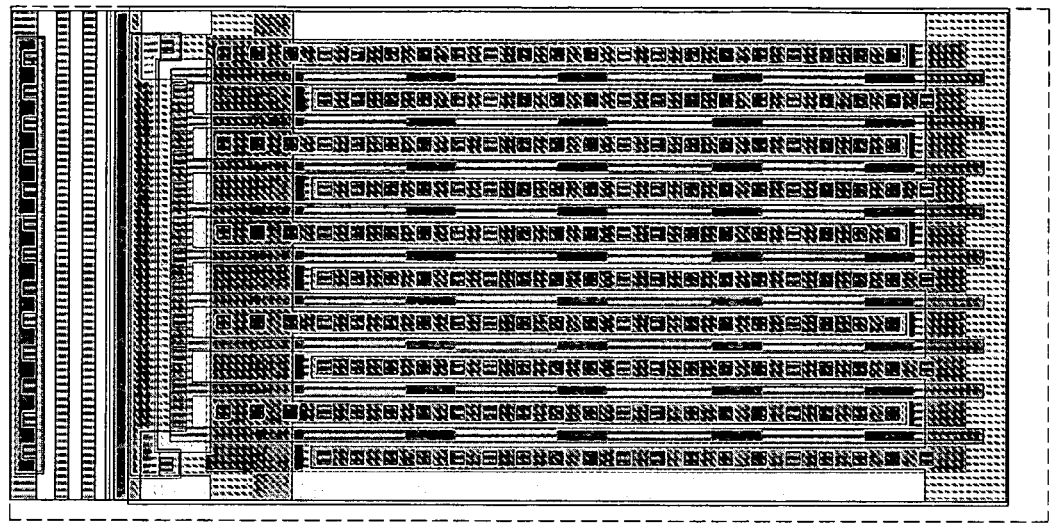
FIG. 3 illustrates a layout diagram of an embodiment of a power gate cell.
Figure 4:
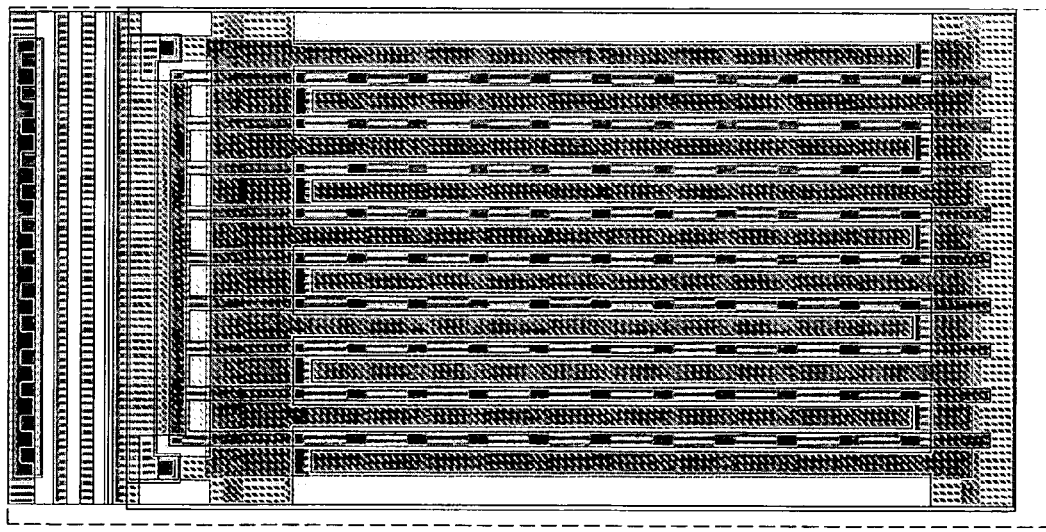
FIG. 4 illustrates a layout diagram of an embodiment of a filler cell.

FIG. 3 illustrates a layout diagram of an embodiment of a power gate cell. FIG. 4 illustrates a layout diagram of an embodiment of a filler cell. The instances of these power gate cell 370 and filler cell 372 differ from each other merely in the contact mask. Similarly, a designer can also design a filler cell that is the unit tile of a ring design fabric that can be customized to create the different elements of the ring by changing only a few masks. FIGS. 3 and 4 demonstrate a potential cost saving when an engineering change order specifies a change in the number of power gate cells required to power up a block after a prototype of the chip has been processed. The structure illustrated in FIGS. 3 and 4 enable a power gating cell to be changed to a filler cell, or vice versa, after a prototype of the chip has been generated with only a single mask change. The selectable cells in the library allow a minimum impact on block level placement and therefore timing because changing between a filler cell to a power gating cell can be added as an incremental upgrade without block re-layout.

Figure 8:
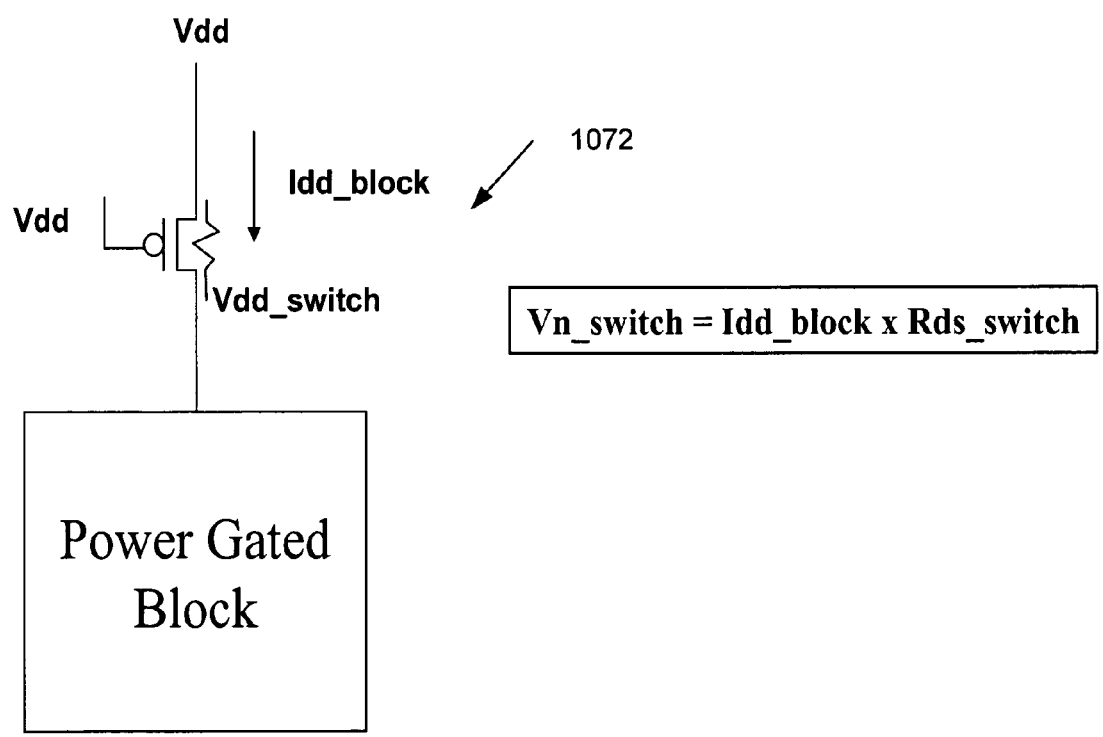
FIG. 8 shows a schematic representation of a power gate cell with its MOS switch having its connection wired to the power rails.

Note, the metal rail for the ring structure can be formed in a metal layer lower in height, such as metal layer 1, than the metal layer, such as metal layer 2, used for general routing of the global power rails for VSS and VDD. FIG. 8 shows a schematic representation of a power gate cell with its MOS switch 1072 having its connection wired to the power rails.

Figure 5:
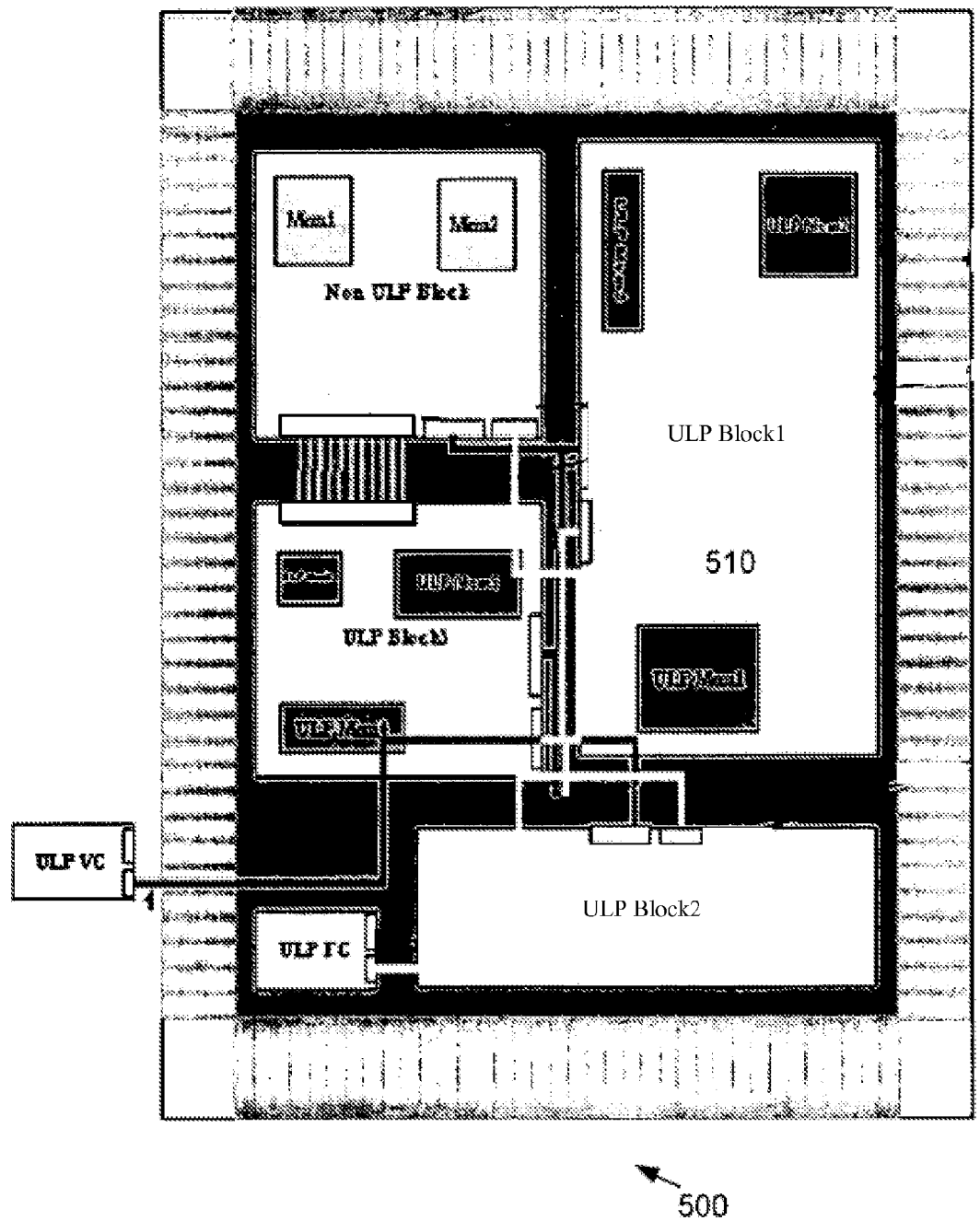
FIG. 5 illustrates a block diagram of an example portion of a chip with one or more blocks of logic each powered up by an embodiment of an instance of the power distribution structure.

FIG. 5 illustrates a block diagram of an example portion of a chip with one or more blocks of logic each powered up by an embodiment of an instance of the power distribution structure. The ring shaped power distribution structure 500 powers up and down one or more blocks of logic 510 containing a plurality of individual cells. The example block of logic 510 can generally form an entire intellectual property block or sub blocks of a wholly integrated functional unit in large intellectual property block. In this case, Ultra Low Power blocks 1, 2, and 3 containing ultra low power memories 1-5, low power clock circuit, and low power voltage ramp control circuit would be examples of sub blocks within a large intellectual property block. Each of these Ultra Low Power sub blocks contain multiple self-contained functional circuits and each self-contained functional circuit can contain hundreds to millions of individual cells.

Figure 9:
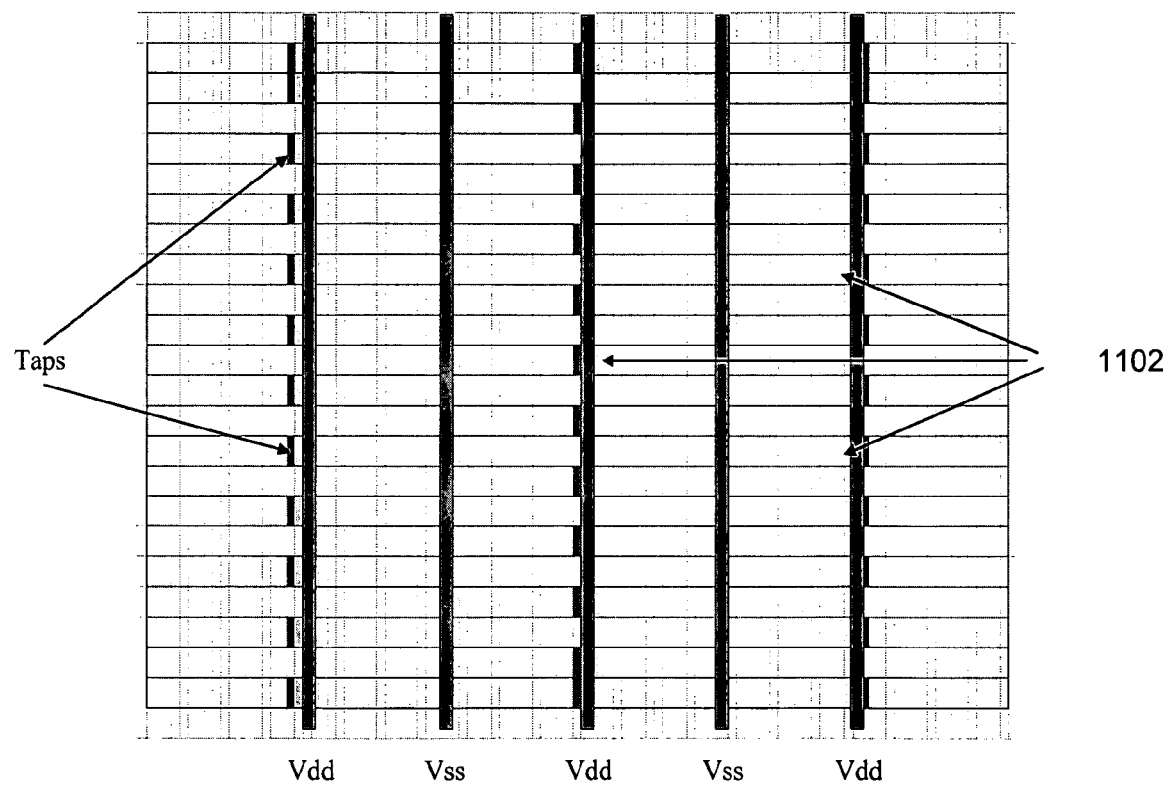
FIGS. 9-11 show layout diagrams of an embodiment of row level power gating with the power distribution structure in the chip.
Figure 10:
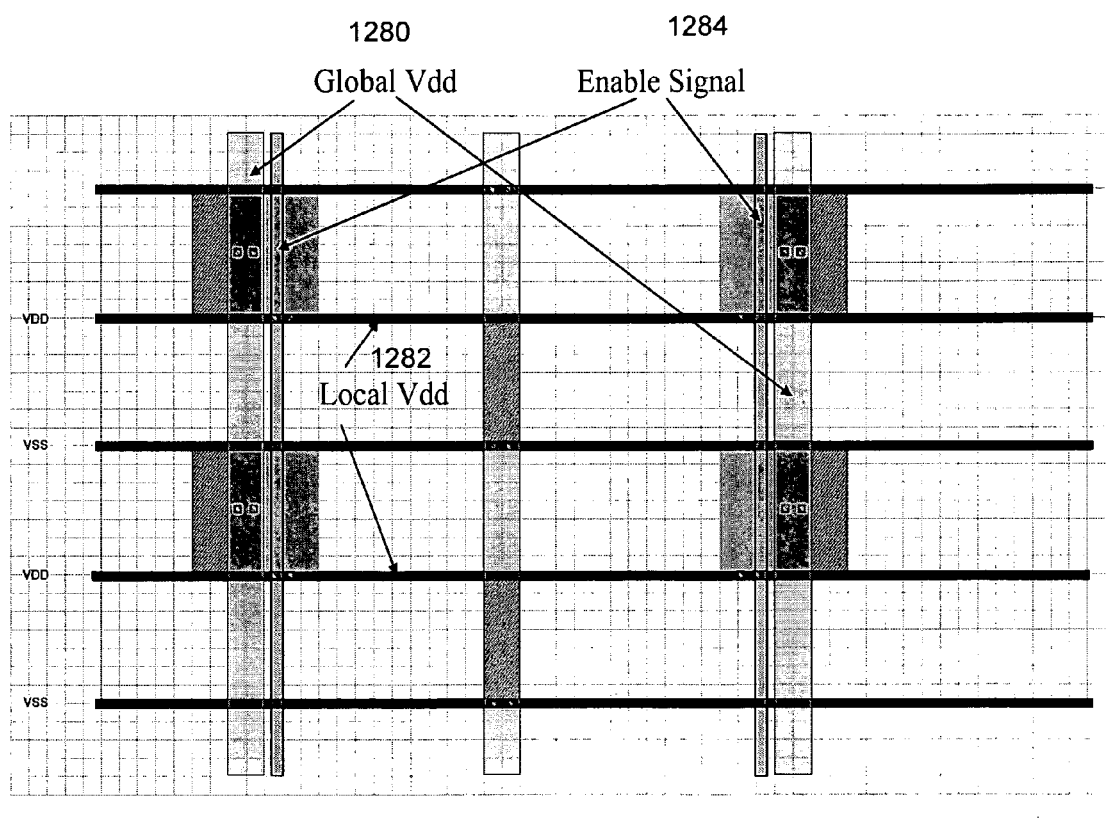
Figure 11:
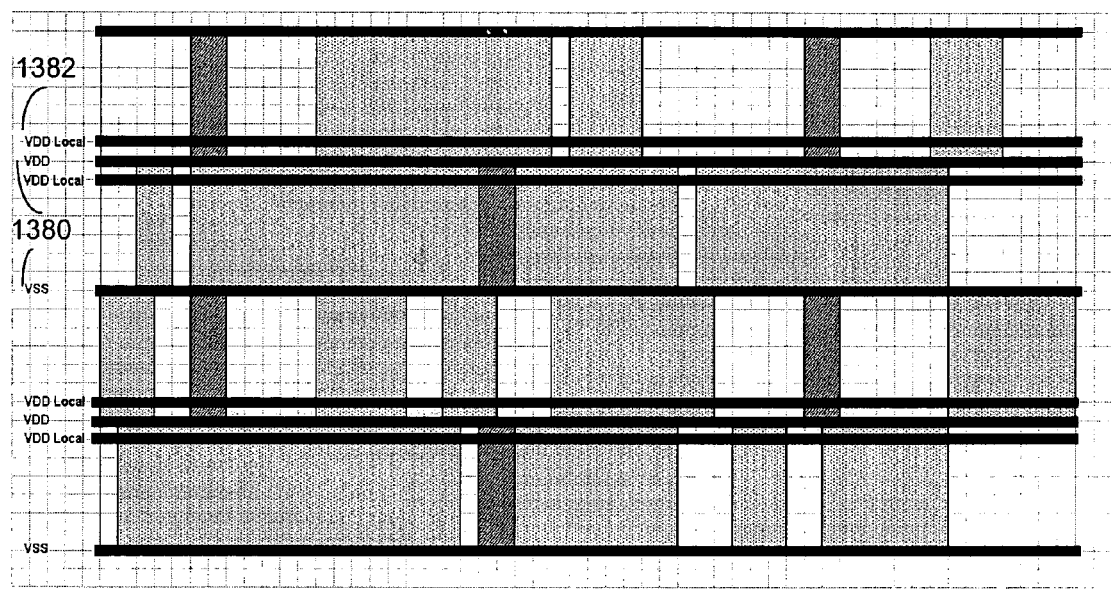

FIGS. 9-11 show layout diagrams of an embodiment of row level power gating with the power distribution structure in the chip. FIG. 9 shows power gates 1102 along the rows. FIG. 10 shows a pre-placement view of the power gates and the global power rails 1280, the local power rails 1282, and the enable signal rail 1284 to the power gate cells. FIG. 11 shows a post placement view of the global power rails 1380 and the local power rails 1382. The global power rails for VSS and VDD are routed along the rows of a chip. The shape of the power distribution structure may be something other than a continuous ring such as the dispersed power gating cells and other types of cells along the rows. However, the different types of cells, different varieties of MOS devices, amounts of each type of cell and placement of those cells in the chip may all come a common library for the power distribution structure. The library allows for many different instances of the power distribution structure in shape and composition.

Figure 12:
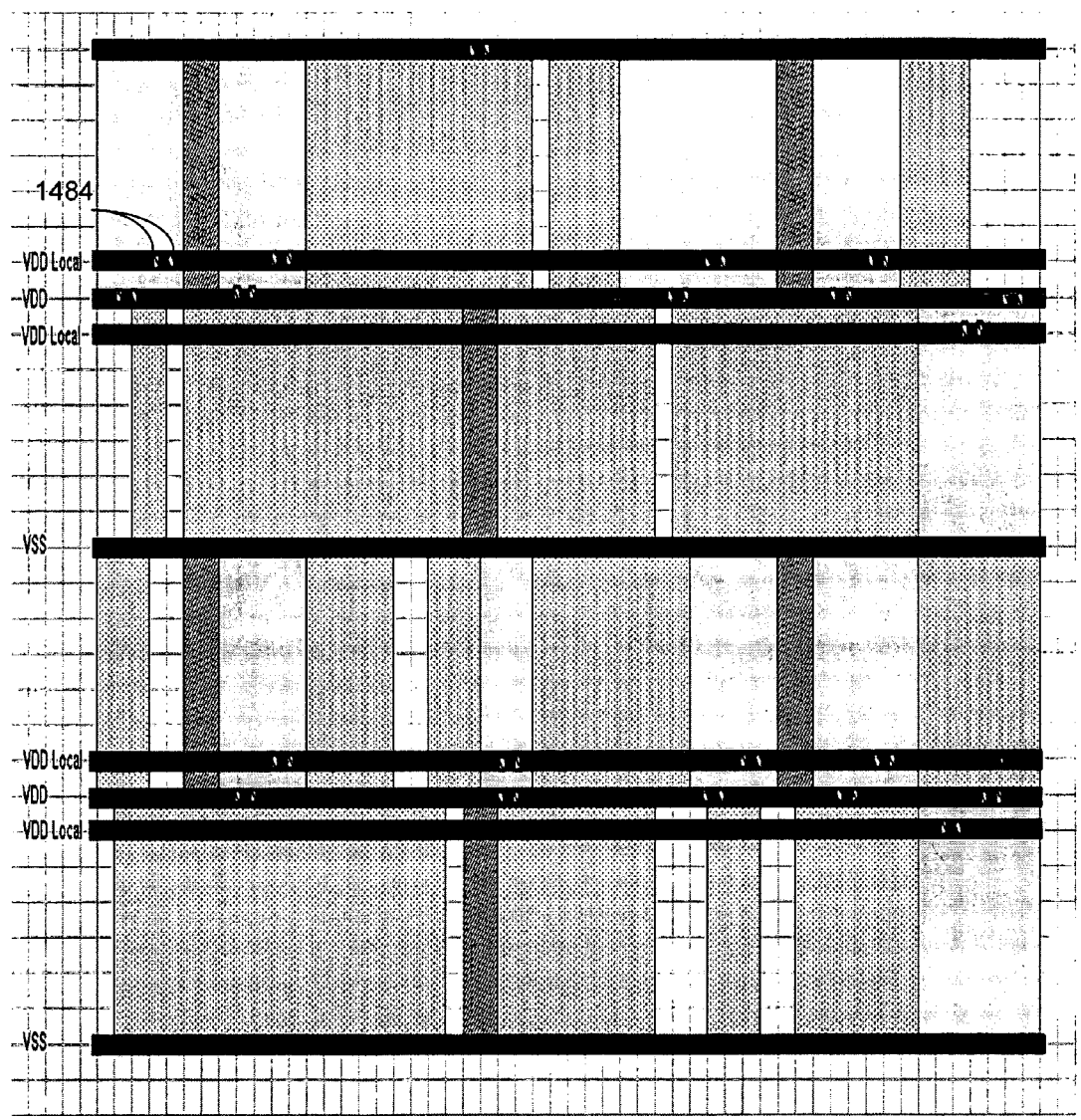
FIG. 12 shows a block diagram of an embodiment of individual cell level power gating in the chip.

FIG. 12 shows a block diagram of an embodiment of individual cell level power gating in the chip. Individual cells, such as a first individual cell 1484 may cooperate with an instance of the power distribution structure. FIG. 6 also shows a block diagram of an embodiment of individual cell level 884 power gating in the chip.

Figure 13:
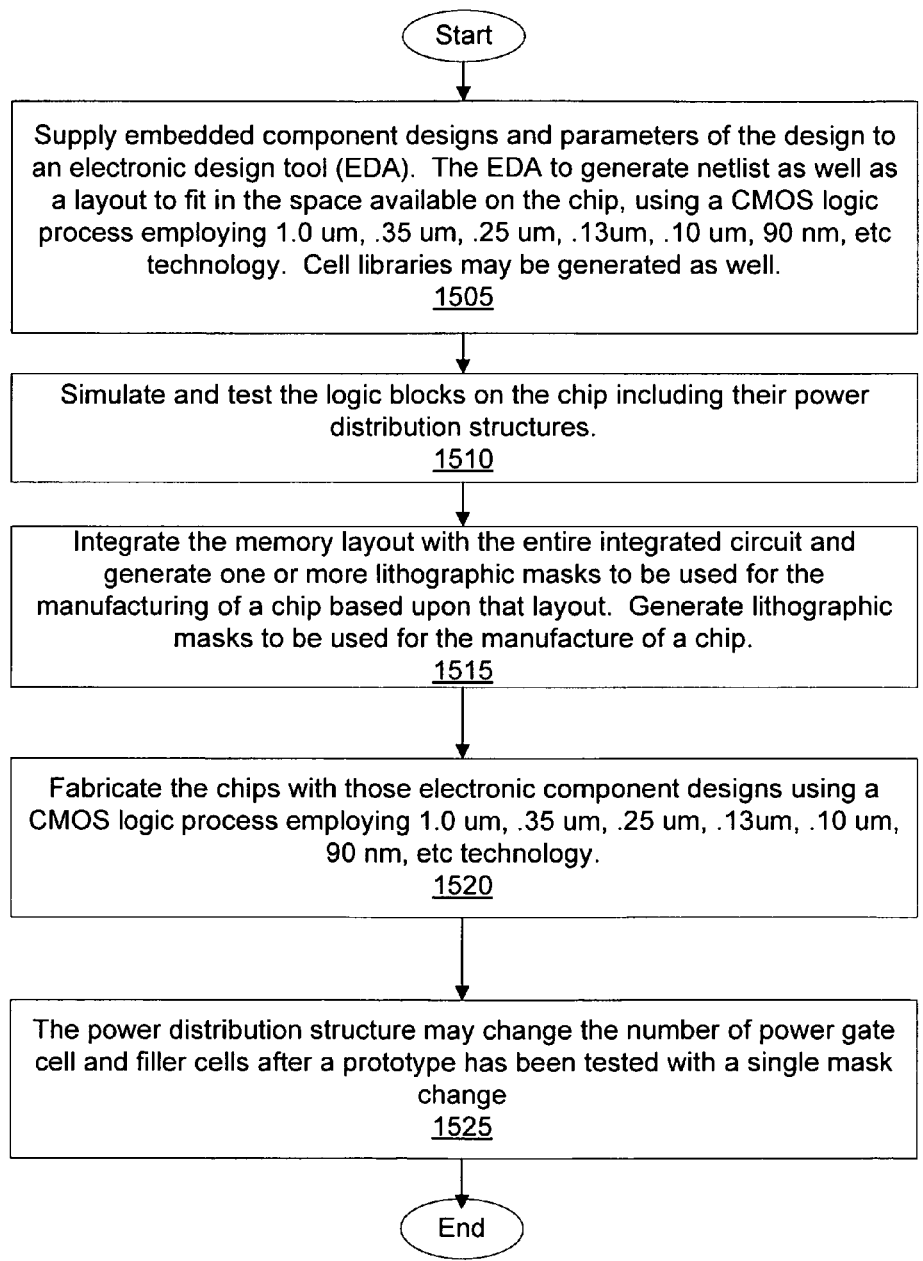
FIG. 13 illustrates an example process of generating logic platforms from designs of electronic components with an embodiment of an electronic circuit design generator such as an Electronic Design Automation (EDA) generator cooperating with a library for the power distribution structure.

FIG. 13 illustrates an example process of generating logic platforms from designs of electronic components with an embodiment of an electronic circuit design generator such as an Electronic Design Automation (EDA) generator cooperating with a library for the power distribution structure. The example process for generating a device with power distribution structures may utilize an electronic circuit design generator, such as a compiler, to form part of an EDA toolset. The information representing the apparatuses and/or methods for the power distribution structure may be contained in an Instance such as a cell library, soft instructions in an electronic circuit design generator such as a compiler, or similar machine-readable storage medium storing this information. The information representing the apparatuses and/or methods stored on the machine-readable storage medium may be used in the process of creating the apparatuses and/or methods described herein.

The electronic circuit design generator may be used for making a highly configurable, scalable System On a Chip (SOC) input output system that integrally manages data, control, debug and test flows, as well as other applications. In an embodiment, an example electronic circuit design generator may comprise the following: a graphic user interface; a common set of processing elements; and a library of files containing design elements such as circuits, control logic, and cell arrays that define the electronic circuit design generator. The electronic circuit design generator may be used in designing a System on a Chip (SOC).

Traditionally, there exist two major stages of SOC design: front-end processing and back-end programming. Front-end processing comprises the design and architecture stages, which includes design of the SOC schematic. The front-end processing may include connecting models, configuration of the design, simulating and tuning during the architectural exploration. The design is typically simulated and tested. Front-end processing traditionally includes simulation of the circuits within the SOC and verification that they should work correctly. The integration of the electronic circuit design may include packing the cores, verifying the cores, simulation and debugging. The tested and verified components then may be stored as part of a library.

Back-end programming traditionally includes programming of the physical layout of the SOC such as placing and routing, or floor planning, of the circuit elements on the chip layout, as well as the routing of all interconnects between components. Thus, the floor plan may be generated imported and edited. After this, the design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist describes the connectivity of an electronic design such as the components included in the design, the attributes of each component and the interconnectivity amongst the components. After the Netlist is generated, synthesizing of the design with Register Transfer Level (RTL) may occur. Accordingly, back-end programming further includes the physical verification of the layout to verify that it is physically manufacturable and the resulting SOC will not have any function-preventing physical defects. A physical prototype of the SoC or integrated circuit may be fabricated.

Accordingly, the front-end views support documentation, simulation, debugging, and testing. The back-end files, such as a layout, physical Library Exchange Format (LEF), etc are for layout and fabrication. The compiler outputs may include Behavioral Models and Test Benches (Verilog, VHDL), •Timing Models (TLF, .Lib and STAMP), Test Models (MemBIST, FastScan), Structural Netlists (EDIF, Spice), Power Models (WattWatcher, ALF), Floorplanning and Place&Route Models, Physical LEF, FRAM, Layout (GDS), Datasheets (including power, timing, and area specifications, as well as other outputs.

In block 1505, the designs for the power distribution structure is supplied to the electronic circuit design generator, as well as other device design parameters. Thus, the designs for a low power circuit design may be supplied to the electronic circuit design generator such as a compiler. As discussed, the electronic circuit design generator may be a software program comprised of multiple algorithms and designs for the purpose of generating a circuit design and a layout in a space available on a target chip. The set of application-specific algorithms and interfaces of the electronic circuit design generator may be used by system integrated circuit (IC) integrators to rapidly create a signal generation circuit suitable for the specific application.

An example electronic circuit design generator may comprise the following: a graphic user interface, a common set of processing elements, and a library of files containing design elements such as circuits, and control logic. The library of files containing design elements may be a stand-alone program by itself as well. In addition, the electronic circuit design generator may include object code in a set of executable software programs. The electronic circuit generator provides timing diagrams, power and area aspects of each component, models coded to represent the components in order to run actual operation and configuration simulations. The electronic circuit design generator may generate a Netlist and a layout targeted to fit in the space available on a target chip. Typically, the electronic circuit design generator will store the data representing the logic blocks, I/O and test circuits, and power distribution structure on a machine-readable storage medium. The electronic circuit design generator then may provide the device layout (including the power distribution structure) to be used to generate one or more lithographic masks utilized in the fabrication of the device including the test circuit. The electronic circuit design generator may also provide a netlist for verification of the device and test circuit.

At block 1510, the electronic circuit design generator may provide designs to simulate and test the logic blocks including their power distribution structures on the chip. The machine may generate simulations of representations of the circuits described above that can be functionally tested, timing tested, debugged and validated.

In block 1515, the generated device layout may be integrated with the rest of the layout for the chip. The machine may generate one or more lithographic masks for transferring the circuit design onto the chip during manufacture. The lithographic masks that contain the information necessary for the fabrication of a functional device. In an embodiment, this involves integrating the signal generation circuit on an available space on the chip. Overall, the machine may generate representations of the circuits described above for simulations, one or more lithographic masks for transferring the circuit design onto the chip during manufacture, or other similar useful derivations of the circuits described above.

In block 1520, a fabrication facility may fabricate one or more chips with the signal generation circuit utilizing the lithographic masks generated from the electronic circuit design generator's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn, determines minimum component size. According to one embodiment, light may pass through these lithographic masks onto the chip to transfer the circuit design and layout for the test circuit onto the chip itself. In one embodiment, the electronic circuit design generator is designed for embedded applications in a standard CMOS logic process.

In block 1525, the power distribution structure may change the number of power gate cell and filler cells after a prototype has been tested with a single mask change. The ring structure of different types of cells grows current capacity based on a block size of the logic block and a block current consumption of the logic block. The ring structure of different types of cells also amortizes total area used for power gating transistors across the whole block; and continues power mesh around block seamlessly.

In one embodiment, an electronic circuit design generator may be implemented in software as a set of data and instructions, such as a software cell library callable to other programs or an electronic circuit design generator consisting of an executable program with the software cell library in one program, stored on a machine-readable medium. A machine-readable storage medium may include any mechanism that provides (e.g., stores and/or transmits) information in a form readable by a machine (e.g., a computer). For example, a machine-readable medium, may include, but not be limited to: read only memory (ROM); random access memory (RAM); magnetic disk storage media; optical storage media; flash memory devices; DVD's; electrical, optical, acoustical or other forms of propagated signals (e.g., carrier waves, infrared signals, digital signals); EPROMs; EEPROMs; FLASH, magnetic or optical cards; or any other type of media suitable for storing electronic instructions.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. Each logic block in the chip may have its own power distribution structure. Each ring may have additional different types of cells including testability related cells such as JTAG registers, clock distribution related cells such as clock gating cells, voltage level shifting cells, isolation cells and other signal conditioning cells to deal with the power state of the design (i.e. on or off). Filler cells can be changed after a prototype has been fabricated to the previously described power gating cells as well as the types of cells described above. The invention is to be understood as not limited by the specific embodiments described herein, but only by scope of the appended claims.

The invention claimed is:

1. An integrated chip (IC) comprising:
    a plurality of logic blocks, each of the plurality of logic blocks including a plurality of cells, each cell comprising a combination or a group of electrical components; and
    a plurality of power distribution structures, each of the plurality of power distribution structures surrounding each of the plurality of logic blocks and connecting to at least a cell of a corresponding logic block, each of the power distribution structures including:
        at least one enable cell connected to an enable rail transmitting a control signal, the enable rail spanning across at least three cells in each of the power distribution structures, each of the at least one enable cell comprising a combination or a group of a plurality of electrical components,
        at least two power gating cells comprising a first power gating cell and a second power gating cell, the first power gating cell comprising a first gating element for connecting a power rail to provide a supply voltage to at least one cell in the corresponding logic block according to the control signal received via the enable rail, the second gating cell comprising a second gating element for connecting the power rail to provide the supply voltage to the at least one cell, the first gating element and the second gating element having different voltage threshold characteristics or a different channel length, the first power gating cell and the second power gating cell available from a same cell library, and
        at least one filler cell comprising a gating element having a source terminal and a drain terminal not connected to the power rail but having a gate terminal connected to receive the control signal;
        wherein a number of the at least one enable cells, a number of the at least two power gating cells and a number of the at least one filler cell in each of the power distribution structures and voltage threshold characteristics or channel lengths of the at least two gating elements are selected to configure a current profile or voltage profile at a node in the corresponding logic block.

2. The IC of claim 1, wherein each of the at least two power gating cells comprises a P-type Metal Oxide Semiconductor Field Effect Transistor (MOS) or N-type MOS, wherein a gate of the P-type MOS or N-type MOS is connected to the enable rail.

3. The IC of claim 1, wherein each of the power distribution structures further includes at least one corner cell configured to connect power rails to cells at different portions of each of the power distribution structures.

4. The IC of claim 3, wherein the at least one enable cell and the at least two power gating cells are separated by at least one cell in each of the power distribution structures.

5. The IC of claim 3, wherein the power rail is formed as a metal layer lower in height than another metal layer for routing power to the IC.

6. The IC of claim 3, wherein the at least one corner cell is configured to connect a power rail extending along a first side of each of the power distribution structures and another power rail extending along a second side of each of the power distribution structures perpendicular to the first side.

7. The IC of claim 1, wherein the at least one enable cell is further configured to propagate an acknowledge signal to a plurality of cells in each of the power distribution structures.

8. The IC of claim 1, wherein a first individual cell in at least one of the logic blocks is configured to have a first level of operating voltage and a second individual cell in the at least one of the logic blocks is configured to have a second level of operating voltage and the first individual cell connects to a first power trace that provides a first voltage potential from each of the power distribution structures and the second individual cell connects to a second power trace that provides a second voltage potential from each of the power distribution structures.

9. The IC of claim 8, wherein the first individual cell in the corresponding logic block connects to a third power trace that provides a third voltage potential to the first individual cell turned off during a sleep mode, and the corresponding logic block comprises different individual cells.

10. The apparatus of claim 1, wherein the first gating element and the second gating element have the different voltage threshold characteristics due to (i) difference in a channel type, (ii) a different voltage threshold or (iii) a different gate oxide thickness.

11. A method of designing an integrated chip (IC), comprising:
receiving a configuration of a plurality of logic blocks in the IC, each of the logic blocks associated with a separate power distribution structure and including a plurality of cells, each cell comprising a combination or a group of a plurality of electrical components;
for each of the logic blocks, receiving configuration of a corresponding power distribution structure, the configuration comprising a first configuration of an enable cell for connection to an enable rail spanning across at least three cells in the corresponding power distribution structure of each of the logic blocks to send a control signal via the enable rail, and a second configuration of at least two power gating cells comprising a first power gating cell and a second power gating cell, the first gating cell comprising a first gating element for connecting at least one cell in each of the logic blocks to a power rail to provide a supply voltage according to the control signal, the second gating cell comprising a second gating element for connecting the power rail to provide the supply voltage to the at least one cell, the first gating element and the second gating element having different voltage threshold characteristics, the first power gating cell and the second power gating cell available from a same cell library, and a third configuration of at least one filler cell comprising a gating element having a source terminal and a drain terminal not connected to the power rail but having a gate terminal connected to receive the control signal;
placing the corresponding power distribution structure to surround each of the logic blocks and connect to at least at least a cell in each of the logic blocks;
by a processor, determining a number of enable cells, a number of the power gating cells and a number of the filler cells and the voltage threshold characteristics or channel lengths of the at least two gating elements to generate a first design of the IC; and
changing the number of power gating cells and the number of filler cells in the first design by connecting one or more power gating elements of a subset of the filler cells to the power rail or removing connection of one or more power gating elements of the subset of the power gating elements to the power rail to generate a second design of the IC based on a measurement taken from an IC fabricated using the first design.

12. The method of claim 11, further comprising placing the at least two power gating cells based on the second configuration and one or more enable cells based on the first configuration in the corresponding power distribution structure.

13. The method of claim 11, further comprising:
placing one or more corner cells in the corresponding power distribution structure that provide connection of a power rail extending along a first side of the corresponding power distribution structure and another power rail extending along a second side of the corresponding power distribution structure perpendicular to the first side.

14. The method of claim 11, wherein the number of power gating cells and the number of filler cells are changed by changing a mask.

15. The method of claim 11, wherein the first gating element and the second gating element have the different voltage threshold characteristics due to (i) difference in a channel type, (ii) a different voltage threshold or (iii) a different gate oxide thickness.

16. A non-transitory computer readable storage medium comprising instructions when executed by a processor cause the processor to:
receive a configuration of a plurality of logic blocks in an integrated circuit (IC), each of the logic blocks associated with a separate power distribution structure and including a plurality of cells, each cell comprising a combination or a group of a plurality of electrical components;
for each of the logic blocks, receive configuration of a corresponding power distribution structure, the configuration comprising a first configuration of an enable cell for connection to an enable rail spanning across at least three cells in the corresponding power distribution structure of each of the logic blocks to send a control signal via the enable rail, and a second configuration of at least two power gating cells comprising a first power gating cell and a second power gating cell, the first gating cell comprising a first gating element for connecting at least one cell in each of the logic blocks to a power rail to provide a supply voltage according to the control signal, the second gating cell comprising a second gating element for connecting the power rail to provide the supply voltage to the at least one cell, the first gating element and the second gating element having different voltage threshold characteristics, the first power gating cell and the second power gating cell available from a same cell library, and a third configuration of at least one filler cell comprising a gating element having a source terminal and a drain terminal not connected to the power rail but having a gate terminal connected to receive the control signal;
place the corresponding power distribution structure to surround each of the logic blocks and connect to at least at least a cell in each of the logic blocks;
determine a number of enable cells, a number of the power gating cells and a number of the filler cells and the voltage threshold characteristics or channel lengths of the at least two gating elements to generate a first design of the IC; and change the number of power gating cells and the number of filler cells in the first design by connecting one or more power gating elements of a subset of the filler cells to the power rail or removing connection of one or more power gating elements of the subset of the power gating elements to the power rail to generate a second design of the IC based on a measurement taken from an IC fabricated using the first design.

* * * * *